United States Patent Office 3,382,284
Patented May 7, 1968

---

3,382,284
PREPARATION OF DIOLS
Heinz Schulze, Austin, Tex., assignor to Jefferson Chemical Company, Inc., Houston, Tex., a corporation of Delaware
No Drawing. Filed Aug. 31, 1964, Ser. No. 393,359
4 Claims. (Cl. 260—613)

This invention concerns a method for the preparation of diols. More particularly, this invention concerns a method for the preparation of nearly bifunctional condensation products of formaldehyde and aryloxyalkanols.

The condensation of aromatic compounds with formaldehyde in the presence of acid catalysts is a well-known reaction and is extensively reviewed in Houben, Methoden der Organischen Chemie, vol. 14/2, p. 302, Georg Thieme Verlag, Stuttgart, Germany (1962). As early as 1874, a bis(methoxy)diphenylmethane was prepared by the condensation of anisol with methylal in acetic acid and concentrated sulfuric acid (Ter Mer, Chem. Ber., 7, 1200 (1874)). Attempts to extend this reaction to the preparation of methylenebis(aryloxyalkanols) from aryloxyalkanols and formaldehyde have been unsuccessful. For example, in 1920 in German Patent No. 364,042, it was disclosed that the condensation of phenoxyethanol with formaldehyde in the presence of hydrochloric acid produced rubbery, polymeric materials, and in United States Patent No. 2,880,187, there is disclosed the condensation of phenoxy-ethanol with formaldehyde in the presence of sulfuric acid to yield a polymer having a molecular weight of about 700 and containing five hydroxyl groups per molecule.

Further, when aromatic compounds (except phenols) are reacted with formaldehyde, the formation of ether and acetal linkages compete with the formation of the desired methylene linkage. Both ether and acetal formation consume more formaldehyde than does the formation of the methylene bridge. It has been reported that only the most reactive phenol ethers give products containing a high percentage of methylene linkages (Houben, supra, p. 303) and that substantial amounts of benzyl ethers are always formed (R. Wegler, Angew. Chem., 60, 88 (1948)).

Still further, under mild conditions there is a tendency for the formaldehyde to react with the aliphatic hydroxyl group of an aryloxyalkanol to yield formals as described, for example, in United States Patent No. 2,979,533. These formals are comparatively stable.

Finally, under energetic conditions, hydroxyalkylaryl ethers may be cleaved by acid catalysts and the resulting phenolic contaminants adversely affect the cure of unsaturated polyesters made from such polyols.

I have now discovered that a condensation product having an average of about two hydroxyl groups per molecule can be obtained by the reaction of an aryloxyalkanol with formaldehyde in the presence of an acid catalyst employing the proper reaction conditions and an aryloxyalkanol to formaldehyde molar ratio of at least about 2:1. The proper conditions vary, depending on a number of factors, as will be discussed in more detail hereinbelow. The nearly bifunctional products obtained contain not more than about 2.25 hydroxyl groups per molecule and are useful as intermediates in the preparation of surface active compounds, polyesters having superior stability toward chemical agents, polyurethanes, and, in general, may replace more conventional aliphatic glycols in cases where it is desirable to have an increased aromatic content.

The aryloxyalkanol to be employed in accordance with the present invention is an aryloxyalkanol having the formula:

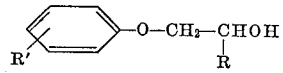

wherein R is selected from the group consisting of hydrogen, methyl, ethyl and phenyl and R' is selected from the group consisting of hydrogen, methyl and ethyl. Examples of suitable aryloxyalkanols include phenoxyethanol, phenoxypropanol, o-tolyloxypropanol, o-tolyloxyethanol, 1-phenyl-2-phenoxyethanol, etc.

Formaldehyde is preferably employed as paraformaldehyde, but may also be used in any of its other forms such as, for example, trioxane or formalin solution.

Acid catalysts useful in the reaction of aromatic compounds with formaldehyde are well known to those skilled in the art and are described, for example, in United States Patents No. 2,979,533 and No. 2,200,763, German Patent 1,051,864, Houben, supra, p. 313 and Wegler, supra. The preferred catalysts for my process are hydrochloric acid, sulfuric acid and acid clays, such as, for example, Superfiltrol, which is a bentonite clay treated with sulfuric acid and is manufactured by the Filtrol Corporation. Water soluble acids are preferably employed in aqueous solution.

The most critical variables in the present process are temperature, acid concentration and formaldehyde to aryloxyalkanol molar ratio. These factors must be controlled to guard against the above-described undesirable side reactions, and are so interrelated that one cannot be discussed without discussing the others. For example, the rate of ether cleavage is accelerated by high temperatures and high acid concentrations. The cleavage of the ether linkage is demonstrated in Example I, wherein phenoxypropanol was heated with Superfiltrol acid clay. The phenol content before heating was 0.15% and after heating was 0.3%. The use of higher temperatures and higher acid concentrations results in more cleavage of the ether group.

EXAMPLE I

Phenoxypropanol (304 g., 2 mols, containing 0.15% phenol) and Superfiltrol (grade 1, 12 g.) were stirred six hours at 110° C. in an atmosphere of nitrogen. After cooling and filtration, the phenoxypropanol contained 0.3% phenol.

The temperature and acid concentration are also factors in the polycondensation of the aryloxyalkanol and formaldehyde to form higher condensation products, higher temperatures and acid concentrations favoring polycondensation. Polycondensation is also affected by the molar ratio of aryloxyalkanol to formaldehyde with the preferential formation of bifunctional products favored by ratios above two. I have also discovered that the formation of polycondensation products is reduced if the aryloxyalkanol has one of the ortho or para positions blocked as in o-tolyloxypropanol. This is demonstrated in Example IX wherein the condensation of o-tolyloxypropanol with formaldehyde resulted in a condensation product having an average functionality of slightly less than two.

Polycondensation may be reduced or avoided by the use of mild conditions of low acid concentration and moderate temperature; however, such conditions tend to promote ether and/or formal formation. A typical formal formation under mild conditions is shown in Example II.

EXAMPLE II

One hundred thirty-eight g. (1 mol) of phenoxyethanol, 15 g. (0.45 mol) of paraformaldehyde, 1.9 g. (0.01 mol) of p-toluenesulfonic acid and 80 ml. of toluene were heated with stirring. Within three hours the temperature was increased from 90° to 126° C. and held two hours at 126° C. Water was removed azeotropically and collected in a Dean Stark trap. The solution was then neutralized by the addition of 0.92 g. (0.011 mol) of sodium bicarbonate in 10 ml. of water. This added water was then removed azeotropically and the solution was filtered with a filter aid and distilled. The residue was held for 1¾ hours at a pot temperature of 130° C. and a pressure of 0.2 mm. The hazy residue was then filtered to give a clear, light brown liquid with a hydroxyl number of 56 and an osmometric molecular weight of 426.

A molecular weight of 426 requires slightly less than three phenoxyethanol groups per molecule. However, a hydroxyl number of 56 corresponds to an average of only 0.42 hydroxyl groups per molecule. This indicates that a high percentage of the hydroxyl groups are present as formals.

Thus, there are numerous potential side reactions to interfere with the formation of the desired bifunctional product. Some of these side reactions occur under mild conditions while others occur under stringent conditions. In view of the prior art teaching of the predominance of the side reactions it was unexpected that properly correlated conditions could be found whereby high yields of the desired, essentially bifunctional products can be obtained substantially free from undesirable phenolic contaminants.

In general, it may be said that my process can be conducted at temperatures ranging from about 40° to about 160° C., depending upon the strength and concentration of the acid catalyst employed. The lower temperatures should be employed with stronger and more concentrated acids while the higher temperatures are sometimes required to effect the reaction when weak and dilute acids are employed as catalysts. The preferred temperature range is from about 60° to about 130° C.

The amount of catalyst employed may vary over extremely wide limits, depending upon the particular catalyst employed. Molar ratios of catalyst to formaldehyde of up to about 1:1 are normally used. More catalyst offers no further appreciable improvement. The reaction will proceed readily in the presence of very small amounts of catalyst as, for example, in Example VII, wherein the ratio of catalyst to formaldehyde is about 1:75. Ratios of 1:100 or lower may be employed.

Obviously, a molar ratio of aryloxyalkanol to formaldehyde of at least about 2:1 is required to prepare a bifunctional condensation product. The use of ratios in excess of this aid in suppressing polycondensation and formation of polyfunctional products. Any excess desired may be used, limited only by the facilities needed to recover the unreacted aryloxyalkanol. Ratios above about 10:1 are not practical. The preferred ratio of aryloxyalkanol to formaldehyde is within the range of about 4:1 to about 8:1.

At the completion of the reaction, the acid catalyst should be removed prior to recovery of the product. Soluble catalysts may be removed by washing with water or by neutralization with an alkaline material. The salts formed may then be removed by filtration or washing with water. Acid clays may be removed by filtration.

After removal of the catalyst, unreacted aryloxyalkanol is removed from the product by distillation. Alternatively, if the product is a solid it may be recovered by precipitation from a suitable solvent or by the use of other known means of separation, such as solvent extraction.

The present process will be further illustrated by the following specific examples, which are not intended to limit the invention in any respect.

Example III

A mixture of 760 g. (5 mols) of phenoxypropanol, 16.5 g. (0.5 mol) of paraformaldehyde (91%) and 30 g. of Superfiltrol acid clay (grade 1) was heated with stirring for two hours at 95°–97° C. Over a period of two hours, the temperature was increased to 126° C. and held for two additional hours at 126°–128° C. The reaction mixture was filtered and distilled to remove unreacted phenoxypropanol. The residue was held for two hours at a pot temperature of 135° C. and a pressure of 0.1 mm. The residue crystallized on cooling and was a cream colored, waxy solid having a hydroxyl number of 348 and an osmometric molecular weight of 329, corresponding to an average of 2.04 hydroxyl groups per molecule.

Example IV

In an inert atmosphere phenoxypropanol (2432 g., 16 mols), p-formaldehyde (132 g., 4 mols) and Superfiltrol acid clay (grade 1, 96 g.) were heated with stirring to 127° C. within 115 minutes and held two hours at this temperature. During this time a water phase (59 g.) was collected in a Dean Stark trap. The reaction mixture was filtered hot from the catalyst. The clear filtrate was distilled in a high vacuum and, finally, held 85 minutes at a temperature of 180° C. at 4–5 mm. pressure. Phenoxypropanol (1236 g.) was recovered. The distillation residue was a nearly colorless liquid which crystallized gradually on storage. The waxy product had a hydroxyl number of 347 and an osmometric molecular weight of 344, corresponding to 2.13 hydroxyl groups per molecule.

Example V

As in the preceding example, phenoxypropanol (1216 g., 8 mols), p-formaldehyde (66 g., 2 mols) and Superfiltrol acid clay (grade 1, 48 g.) were heated within 45 minutes to 110° C. and maintained nine hours at 110–113° C. The reaction product was filtered and distilled as above. Phenoxypropanol (593 g.) was recovered. The distillation residue (534 g.) had a hydroxyl number of 352 and an osmometric molecular weight of 352, corresponding to an average of 2.2 hydroxyl groups per molecule.

Example VI

Phenoxypropanol (1216 g., 8 mols) and concentrated hydrochloric acid (164 ml., 2 mols) were mixed with stirring under nitrogen. The temperature of the solution rose from an initial 24° C. to 32° C. Paraformaldehyde (66 g., 2 mols) was added and the mixture heated to 70° C. within 15 minutes. An exothermic reaction occurred and the temperature was held below 77° C. by occasional cooling. After approximately 35 minutes, the heat development subsided. The solution was heated another hour at 76° C., cooled to 60° C. and treated with sodium hydroxide (92 g., 2.3 mols) in water (184 ml.). The mixture was heated one hour at 108° C. and neutralized with carbon dioxide without further heating. At 86° C., the aqueous phase was separated and discarded. The organic phase was dried at a final pot temperature of 120° C. at 4–5 mm. pressure. The turbid, light yellow residue was filtered hot through a bed of Superfiltrol acid clay (30 g.). Unreacted phenoxypropanol was removed by distilling to a temperature of 175°–180° C. at 4–5 mm. pressure until the distillation ceased. A nearly colorless liquid residue which solidified on cooling to a white, hard wax was obtained. The product had an average molecular weight of 331 and a hydroxyl number of 354, corresponding to an average of 2.09 hydroxyl groups per molecule.

Example VII

In an atmosphere of nitrogen were heated and stirred phenoxypropanol (1216 g., 8 mols), p-formaldehyde (66 g., 2 mols) and dilute sulfuric acid (14.8 g., 0.0266 mol). Within 70 minutes the mixture was heated to 100° C. and maintained 90 minutes at this temperature. A Dean Stark trap was attached to the flask to collect water and heating continued so that the temperature reached 165° C. within 30 minutes. After slight cooling, water (25 ml.) was added and reflux continued 30 minutes at 123° C. At 65° C. barium hydroxide octahydrate (12.6 g., 0.04 mol) was added and the mixture heated one hour at the reflux temperature (118°–120° C.), cooled and stirred overnight under carbon dioxide. At 100° C. the reaction mixture was filtered through filter aid. The clear filtrate (1158 g.) was distilled in a high vacuum and finally held 60 minutes at a pot temperature of 175°–180° C. at 4–5 mm. pressure. Phenoxypropanol (650 g.) was recovered. The residue (495 g.) crystallized gradually on storage and had a hydroxyl number of 339 and an osmometric molecular weight of 354. This corresponds to 2.14 hydroxyl groups per molecule.

Example VIII

Phenoxyethanol (3317 g., 24 mols), p-formaldehyde (198 g., 6 mols) and concentrated hydrochloric acid (492 ml., 6 mols) were heated with stirring under nitrogen. At 42° C. heat was turned off. The solution became turbid and a mild exothermic reaction occurred which increased the temperature of the mixture to 75° C. This temperature was maintained by occasional cooling with water. After 90 minutes the heat development subsided, the temperature started to drop and the solution became clear. The mixture was maintained at 76° C. for another 90 minutes and stirred into water (7 l.) at 90° C. The aqueous phase was separated and discarded. The organic phase was washed again with water to which sodium bicarbonate (50 g.) was added until the mixture was neutral. After separation of the aqueous phase the product was dried at 105° C. in an aspirator vacuum, filtered, distilled and finally held 70 minutes at a pot temperature of 175°–180° C. at 4–5 mm. pressure. Phenoxyethanol (1231 g.) was recovered. The distillation residue (1669 g.) crystallized on cooling and had a hydroxyl number of 386 and an osmometric molecular weight of 309, corresponding to 2.12 hydroxyl groups per molecule.

Example IX

A rapidly stirred mixture of 830 g. (5 mols) of o-tolyloxypropanol, 74.25 g. (2.25 mols) of paraformaldehyde and 102.5 ml. (1.25 mols) of concentrated hydrochloric acid was heated to 77° C. within 80 minutes and maintained at that temperature for three hours. After cooling to 60° C., 50 g. (1.25 mols) of sodium hydroxide in 60 ml. of water were added and the reaction mixture was stirred on hour at 85° C. An aqueous phase was allowed to separate at 90° C. and was discarded. The viscous organic phase was dried at a final pot temperature of 125° C. at 5 mm. pressure. The residue was filtered while hot with a filter aid and heated at a pot temperature of 190°–195° C. at 4–5 mm. until the distillation ceased. The residue was a clear, light yellow resin having a hydroxyl number of 312 and an average molecular weight of 355, corresponding to an average of 1.98 hydroxyl groups per molecule.

It can thus be seen that formaldehyde may be reacted with an aryloxyalkanol under proper conditions to minimize undesired side reactions of polycondensation, aryloxyalkanol ether cleavage, formal formation and the formation of benzyl ether linkages whereby there is produced a condensation product having about two hydroxyl groups per molecule. These proper conditions include a phenoxyalkanol to formaldehyde molar ratio of at least about 2:1, a temperature of about 40° to about 160° C., the use of an acid catalyst and a catalyst to formaldehyde molar ratio of up to about 1:1. The reaction temperature and amount of catalyst employed must be correlated with each other to reduce side reactions, thus resulting in the formation of the desired product. In general, it can be said that if one is in the high portion of the acceptable range, the other should be in the low portion of the acceptable range. If solid catalysts are used, temperatures above 100° C. are preferred.

Having thus described my invention, I claim:

1. A method for obtaining a product containing an average of about two hydroxy groups per molecule which comprises reacting formaldehyde in the presence of an acid catalyst with an aryloxyalkanol of the formula:

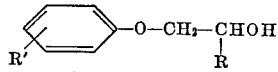

wherein R is selected from the group consisting of hydrogen, methyl, ethyl and phenyl and R' is selected from the group consisting of hydrogen, methyl and ethyl, under reaction conditions including:
   (A) a temperature within the range of about 40° to about 160° C.;
   (B) an aryloxyalkanol to formaldehyde molar ratio of from about 2:1 to about 10:1;
   (C) a catalyst to formaldehyde molar ratio of up to about 1:1.

2. A method as in claim 1 wherein the catalyst is sulfuric acid.

3. A method as in claim 1 wherein the catalyst is hydrochloric acid.

4. A method for obtaining a product containing an average of about two hydroxyl groups per molecule which comprises reacting formaldehyde in the presence of an acid clay catalyst with an aryloxyalkanol of the formula:

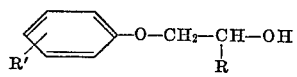

where R is selected from the group consisting of hydrogen, methyl, ethyl and phenyl and R' is selected from the proup consisting of hydrogen, methyl and ethyl under reaction conditions including:
   (A) a temperature within the range of about 40 to about 160° C. and
   (B) an aryloxalkanol to formaldehyde molar ratio of from 2:1 to about 10:1.

References Cited
UNITED STATES PATENTS

| | | | |
|---|---|---|---|
| 2,829,175 | 4/1958 | Bowman et al. | 260—613 X |
| 2,880,187 | 3/1959 | Hanle et al. | 260—19 |
| 3,067,259 | 12/1962 | Bailey | 260—613 |

FOREIGN PATENTS

| | | |
|---|---|---|
| 364,042 | 3/1920 | Germany. |

LEON ZITVER, *Primary Examiner.*

H. MARS, *Assistant Examiner.*